3,244,539
BONDED ALUMINA REFRACTORY

Weston Andrew Hare, Northfield, Wilmington, Del., assignor to E. I. du Pont de Nemours and Company, Wilmington, Del., a corporation of Delaware
No Drawing. Filed July 11, 1963, Ser. No. 294,238
5 Claims. (Cl. 106—65)

This invention relates to shaped objects of bonded granular material which are particularly suitable for use at elevated temperatures and to methods for making them.

The preparation of shaped objects by bonding refractory materials such as magnesia, alumina, and the like has always presented a problem due to the extremely high melting point of these materials. The fusion of pure forms of these refractories requires expensive electric furnace equipment and yields a product deficient in its resistance to thermal shock.

Impurities are commonly added to these materials so that they can be sintered together into products, or various bonding materials such as clay may be added to bond the materials together. Such products show a reduction of the over-all refractoriness of the material, a marked reduction in the ability of the material to bear load at high temperature, and a reduced resistance to thermal spalling. For certain uses the clay and similar bonds are too susceptible to chemical attack to be useful.

It is an object of this invention to provide a relatively low temperature process for the preparation of aggregates of alumina granules.

Another object is to provide an improved shaped object composed of refractory materials and having improved properties under high temperature use.

One object of this invention has been attained by a process comprising mixing from about 6 to 50% preferably 10–40% by weight of particles of the group of aluminum and alloys thereof containing a major amount of aluminum, said particles passing through an 80-mesh screen, with a fluxing agent in an amount of at least 0.02% based on the weight of aluminum and alumina granules. The alumina consists essentially of particles at least half of which are retained on a 100-mesh screen and pass a 4-mesh screen. The mixture is shaped to give a porosity of at least 20% after removal of volatile materials (as measured by heating at 500° C. until equilibrium is reached) and fired in an oxidizing atmosphere at a temperature between 650° C. and 1700° C. for a period of time to oxidize at least 40% of the aluminum, the rate of heating being controlled so that the temperature of the shaped mixture does not exceed the ambient temperature by more than 100° C. (preferably 50° C.).

The shaped refractory resulting from the aforementioned process comprises alumina particles in an amount of from 30 to 89%, bonded by a porous in situ oxidized crystalline bonding phase selected from the class of alpha alumina, compounds of alumina with at least one other oxide, and solid solutions of an oxide in alumina or said alumina compounds, said bonding phase containing at least 72% $Al_2O_3$ (by analysis).

The granular alumina may be in the form of porous or nonporous particles or grains. Strong, useful high temperature resistant products can be made with alumina particles between about 4 and 100 mesh. A particle size of between about 4 and 60 is even more preferred.

When using solid forms of alumina (in contrast to bubbles) a high fired alumina consisting of coarse, well developed alpha alumina crystals is preferably used. Such products are characterized by a relatively low shrinkage (e.g., less than about 10% at 1800° C. for 1 hour) and bulk density in excess of 100 pounds per cubic foot. Tabular alumina (made by the Aluminum Co. of America, Pittsburgh, Pa.) is suitable.

The alumina used should also preferably contain at lease about 0.02% by weight of a fluxing agent as an impurity.

Aluminum particles and particles of alloys of aluminum with other metals in which aluminum constitutes the major component may be used. The metal used is preferably clean and free from grease and oil. The particles should pass an 80-mesh sieve. When less than 20 percent of aluminum is used the use of particles larger than 80-mesh results in poorer bonding of the coarse refractory particles and gives bonded structures with lower strength.

Suitable fluxing agents are an oxide of a metal from the class consisting of the alkali metals, the alkaline earth metals, vanadium, chromium, molybdenum, tungsten, copper, silver, zinc, antimony, and bismuth, precursors of these oxides, and hydroxides of the alkali metals. The oxides and hydroxides of the alkali metals, magnesium, strontium and barium are preferred due to their greater efficiency. The alkali metal compounds are most preferred.

Among suitable precursors of these materials may be mentioned the organic salts such as acetates, benzoates, etc., and inorganic salts such as bisulfates, bisulfites, bromates, nitrates, silicates, sulfates, sulfites, thiosulfates, etc., of the recited metals. While not "per se" within the class of useful fluxing agents, these compounds do, under conditions of the reaction, yield compounds within the above defined class. In addition, trialkyl tin oxide and lead silicate ($PbSiO_3$), are also useful as fluxing agents.

The fluxing agent is calculated on the basis of the metal oxide that it forms in those cases where a metal oxide precursor is used. The metal oxide or hydroxide can vary in amount from 0.02 to 10% or more based on the total weight of the aluminum. Preferably from about 0.2 to 3.0% is used. Higher concentrations of fluxing agent may be employed but are generally avoided, to prevent undue lowering of the melting point of the final structure and loss of strength at elevated temperatures.

Prior to heating the shaped metal aggregate in an oxidizing atmosphere, the surfaces of the metal particles are intimately contacted with the fluxing agent. The agent may be applied dry, in solution, as a gas or as a melt. The manipulative technique of contacting the metal surface with it is not critical. Thus, it may be powdered or sprayed upon the metal, or the metal may be dipped in a solution of the agent or its melt or powder. It is conveniently done using a concentrated aqueous solution or slurry. The use of pressure and/or vacuum to assist in uniform and complete distribution of the agent over the particle surfaces is often advantageous. Furthermore, when using dilute solutions, the addition of a thickener such as sodium carboxy methyl cellulose may be advantageous. The fluxing agent may be mixed with the alumina and the metal shapes added to the mixture.

In some cases it is advantageous to add minor amounts of water, ethyl alcohol, ethylene glycol, acetone solutions of carboxy methyl cellulose, rubber, gum arabic, polyvinyl alcohol, natural gums, glue and the like, to increase the green strength of the shaped objects. A self-bonding additive such as Sorel cement can also be used for this purpose. Preferably a material is used that will burn out under the firing conditions. From about 0.1% to about 2% binder is usually adequate.

The unfired mixture of metal, fluxing agent and alumina should be compacted during the final shaping process to afford a porosity (after removal of volatile materials) of between about 20% and 50% and preferably 25% to 40%.

In the case where very porous structures are desired as in the bonding of porous alumina particles (such as bubbles of alumina), the total porosity may be as high as 75% or more.

The dried "green" molded object is then heated in an oxidizing atmosphere such as air, oxygen or mixtures of oxygen and inert gases at a temperature of at least about 600° C. but below the ignition temperature of the system at the concentration of oxygen employed. The exact conditions for firing will depend upon the green porosity of the shaped object, the amount of metal, the amount and kind of fluxing agent and the temperature. These interactions and variations among them will be apparent to one skilled in the art. To make the best products, the above-mentioned variables should preferably be selected so that a spontaneous and rapid ignition of the aluminum does not take place. Controlled heating will also prevent pooling of the aluminum. Control is conveniently achieved by adjustment of the heating rate and/or flow of oxygen through the furnace as guided by a thermocouple included in a molded refractory mixture in the oven. In general at least the first stages of oxidation should be carried out at a relatively low temperature. For example, a temperature of about 700° to 1050° C. for a period of about ½ to 48 hours can be used with as little as 0.1 to 3% of an alkali metal oxide or hydroxide. The less active fluxing agents such as MgO in the amount of 0.1 to 10% will require from 1 to 72 hours at temperatures of 1000° to 1350° C. or higher. It is preferred to heat at a relatively low temperature initially, until a stress bearing oxide film develops which holds the molded shape of the aggregate during subsequent further oxidation at a higher temperature.

The oxidation of the aluminum is from 90 to 99% complete in the final structure. Preferably the product contains less than 1% metallic aluminum.

In the following examples, porosities are calculated from the apparent density (weight of the body in air/mass volume of the body including opened and closed pores), and the density of the solid material as obtained by crushing the sample and determining the volume of the solids and their weight. The volume measurement is conveniently made on an air comparison pycnometer (model 930, made by Beckman Instruments, Inc. of Fullerton, California). As an approximation, the porosity may be calculated from the apparent density and the calculated density of the solid material in a body of known composition.

All sieve measurements are made with U.S. Sieve Series.

Flexural strength is measured according to ASTM Standard 1958, part 4, page 670, Text No. C293–57T with the use of a span width of 1 to 4 inches.

The products of this invention utilize the strong, microporous, alumina-containing continuum obtained by the in situ oxidation of aluminum powder to bond relatively coarse particles or aggregates of alumina. This unique bond confers greatly improved strength—both at low and elevated temperatures—to the bonded aggregate.

The bond medium has a porosity of about 60 to 80% so that large amounts can be used when desired in a light weight structure.

Petrographic examination of polished cross sections of the products of the examples of this invention shows 3 zones—the particles of refractory (which may contain voids, e.g., bubbles), the bonds between particles, and voids.

The bonding medium constitutes between about 11 and 70% of the refractory product, is extremely porous and consists of a thin porous wall of the alumina-containing material. The pores within the bond wall have an average diameter (i.e., the average of the dimensions through the center, as the pores are not circular) of from 0.4 mil and less to as large as 7 mils. Typically the solid material in the bond occupies less than 50% of the volume of the bond.

The use of larger size particles of aluminum powder e.g., 80/100 mesh, affords somewhat larger pores than above.

It is believed that the strength of the bond is due to the substantially uniform distribution of the solid portions of the bond. When the green structures are rapidly fired (and the temperature of the shaped mixture exceeds the ambient temperature by more than about 50° C.) the uniform bond is not obtained and instead large pores (as much as 10 mils or more in diameter) disrupt the bonds. Also the aluminum tends to accumulate in large pools near the center of the structure and away from its original uniform distribution between refractory particles. This results in a low conversion of the aluminum to oxide. When extended firing is attempted such structures usually crack and burst.

EXAMPLE I

This example illustrates the bonding of alumina bubbles into strong products of extremely low apparent density.

Commercially available alumina bubbles are used having an apparent density of 0.6 g./cm.$^3$ and classified to a sieve size of 10/60 mesh. The bubbles contain at least 0.02% $Na_2O$. The bubbles shown in U.S. Patents 1,682,675 (to Horsfield), 2,340,194 (to McMullen) and 2,553,759 (to Geiger) are satisfactory.

Mixtures of the alumina bubbles, aluminum powder (99.5% Al, 100% passes 200 mesh and 85% passes 325 mesh) and about 1 part by weight of a 2% aqueous solution of sodium carboxy methyl cellulose per 3 parts of alumina-metal mix are well mixed together. The damp mixtures are molded in a 2.25 inch diameter mold under a moderate pressure to a thickness of about 2 inches and the molded pieces dried overnight in a vacuum oven at 120° C. The dried forms are then fired in an air atmosphere under the following schedule:

25 to 650° C. in 8 hours; 650° C. for 12 hours; 750° C. for 12 hours.
750 to 1000° C. in about 4 hours; 1000° C. for 8 hours.
1000 to 1500° C. in 7 hours; 1500° C. for 24 hours.

Items *a* to *f* in Table I are examples of this invention. The effect of the final apparent density on strength is shown by a comparison of items *d* and *e*. Items *g* to *i* are representative of prior art products and are made by the above procedure with the replacement of the aluminum metal with a conventional binder, tabular alumina (passes 325 mesh), in the amount of 11.5, 25 and 32% respectively. These products are inferior to items *a* to *f* in flexural strength, especially when measured at 1550° C. The tabular alumina is a good binding agent and when used as the sole ingredient under the above conditions affords structures having flexural strength of 3600 p.s.i. at 20° C.

When the preparation of item *b* is repeated using mill granules (30/100 mesh, 86% retained on 80 mesh) and grain ingot (20/40 mesh) the products have similar apparent densities but flexural strengths of only 70 and 30 p.s.i. respectively.

Item *j* in Table I is made from 22.2% aluminum powder, 66.7% of the above alumina bubbles and 11.1% of —200 mesh dead burnt magnesia using the above procedure. This illustrates the use of a fine reactive refractory to increase the bonding efficiency of the metal.

Table I

| Item | Alumina Bubbles, Percent | Aluminum, Percent | Fired Product | | | Conversion, Percent |
|---|---|---|---|---|---|---|
| | | | Density | Flexural Strength, p.s.i. | | |
| | | | | 20° C. | 1,550° C. | |
| a | 93 | 7 | 0.90 | 140 | | 100 |
| b | 90 | 10 | 0.92 | 460 | | 100 |
| c | 85 | 15 | 0.90 | 340 | 60 | 100 |
| d | 80 | 20 | 0.90 | 512 | 86 | 100 |
| e | 80 | 20 | 1.80 | 3,200 | | 91 |
| f | 67 | 33 | 1.02 | 680 | | 100 |
| g | 88.5 | 0 | 0.90 | 234 | | |
| h | 75 | 0 | 0.94 | 172 | 4 | |
| i | 68 | 0 | 0.86 | 253 | <4 | |
| j | 66.7 | 22.2 | 0.96 | 725 | | 100 |

EXAMPLE II

The procedure of Example I is followed and the alumina bubbles replaced with commercially available tabular alumina (99.5+% $Al_2O_3$, 0.02% $Na_2O$) of 14/28 mesh. Molding pressures of 1000 to 5000 p.s.i. are used.

The compositions used and the properties of the products are shown in Table II. Items *a* to *c* are illustrative of this invention. Item *d* shows the relatively low strenth of the product obtained from the alumina in the absence of the aluminum powder.

Items *e* and *f* are made using 13.7 and 25.2%, respectively, of fine tabular alumina (passes 325 mesh) as a binder in place of the aluminum powder. These products are inferior to items *a* to *c* in flexural strength and especially so when determined at 1550° C. The latter determination is more representative of actual operating conditions.

Products made using the above procedure from an electrically fused crude alumina (60/120 mesh with a bulk density of 130 pounds/cubic foot) and 20% aluminum powder or 20% aluminum wool have flexural strengths at 25° C. of 1700 and 160 p.s.i. respectively. The superiority of products made from fine aluminum particles as opposed to larger aluminum particles is always observed.

Table II

| Item | Alumina, percent | Aluminum, percent | Conversion, percent | Fired Product | | |
|---|---|---|---|---|---|---|
| | | | | Density | Flexural Strength, p.s.i. | |
| | | | | | 20° C. | 1,550° C. |
| a | 92.8 | 7.2 | 100 | 2.4 | 2,140 | 480 |
| b | 86.8 | 13.2 | 100 | 2.6 | 2,980 | 760 |
| c | 80 | 20.0 | | 2.8 | 3,180 | |
| d | 100 | 0.0 | 99 | | | 103 |
| e | 86.3 | 0.0 | | 2.6 | 2,265 | 103 |
| f | 74.8 | 0.0 | | 2.7 | 1,450 | 99 |

EXAMPLE III

Mixtures containing 30 parts of the aluminum powder of Example I, 70 parts of the highly fired alumina of Example II, and 10 parts of an aqueous solution of meta sodium silicate are prepared, molded to 1 inch x 1 inch x 4 inch bars under 2500 p.s.i. pressure and dried for 8 hours at 100° C. The dried bars are fired in an air atmosphere according to the following schedule—° C. (time in hours): 350 (5), 550 (5), 650 (5), 700 (20), 725 (10), 750 (10), 1000 (15), 1100 (5), 1200 (5), 1300 (5) and 1400 (48). The temperatures are raised between the indicated steps at between 0.5 hour/100° C. at 350° to 3 hours/100° C. at 1300° C.

The alumina is used in 2 sizes (—325 mesh and 14/28 mesh). The proportion of each in the 70 parts used is given in Table III. The 10 parts of sodium silicate solution contains an amount of $Na_2SiO_3$ equal to 0.4% of the weight of the aluminum.

The flexural strengths of the fired samples are given in Table III. All samples are converted between 90 and 100% and have fired densities of 2.6 to 2.7. All samples have a good flexural strength when measured at 25° C. (a minimum of 1480 for item *f* and a maximum of 5780 for item *b*).

It is observed that when the proportion of coarse particles is below about 50% the refractoriness decreases drastically.

Table III

| Item | Alumina, coarse/fine | Flexural Strength, p.s.i. at 1,550° C. |
|---|---|---|
| a | 100/0 | 1,631 |
| b | 80/20 | 863 |
| c | 60/40 | 1,100 |
| d | 50/50 | 746 |
| e | 40/60 | 183 |
| f | 30/70 | 203 |
| g | 20/80 | 77 |
| h | 0/100 | 117 |

It is observed item *h* displays a linear expansion of 10% while the expansion of item *a* is less than 1%.

What is claimed is:

1. A process for preparing a bonded granular material comprising mixing (1) from about 6–50% by weight of particles selected from the group consisting of aluminum and alloys thereof containing a major amount of aluminum, said particles passing through an 80-mesh screen, with (2) a fluxing agent selected from the group consisting of the oxides of the alkali metals, the alkaline earth metals, vanadium, chromium, molybdenum, tungsten, copper, silver, zinc, antimony, and bismuth, precursors of these oxides, and hydroxides of the alkali metals in an amount of from about 0.02% to 10% based on the weight of aluminum and (3) from about 50–94% by weight of alumina granules, shaping the mixture into a porous body having a porosity of at least 20% after removal of volatile materials and firing the body in an oxidizing atmosphere at a temperature between 650° C. and 1700° C. for a period of time sufficient to oxidize at least 40% by weight of the aluminum, the rate of heating being controlled so that the temperature of the shaped structure does not exceed the ambient temperature by more than 100° C.

2. The process of claim 1 wherein the alumina granules consist essentially of particles at least half of which pass through a 4-mesh screen and are retained on a 100-mesh screen.

3. The process of claim 1 wherein the fluxing agent employed is an alkali metal oxide.

4. A bonded granular refractory consisting essentially of from about 30–89% by weight of alumina particles and a porous in situ oxidized crystalline phase, selected from the group consisting of alpha alumina, compounds of alumina with at least one other metal oxide and solid solutions of a metal oxide in alumina, said bonding phase containing at least 72% by weight of alumina by analysis.

5. The product of claim 4 wherein the alumina particles that are bonded consist essentially of particles at least half of which pass a 4-mesh screen but are retained on a 100-mesh screen.

References Cited by the Examiner

UNITED STATES PATENTS

| 2,599,185 | 6/1952 | Lepp et al. | 106—65 |
| 2,741,822 | 4/1956 | Udy | 106—65 |

References Cited by the Applicant

UNITED STATES PATENTS

| 1,374,910 | 4/1921 | Debats. |
| 1,856,303 | 5/1923 | White. |
| 1,911,189 | 5/1933 | Harris. |

OTHER REFERENCES

Schurecht et al.: J. Am. Ceramic Soc., vol. 23, pp. 259–64 (1940).

TOBIAS E. LEVOW, *Primary Examiner.*